United States Patent
Bowden

(10) Patent No.: US 6,296,490 B1
(45) Date of Patent: Oct. 2, 2001

(54) VENTILATION TRAINING ANALYZER MANIKIN

(75) Inventor: Kevin D. J. Bowden, Orangeville (CA)

(73) Assignee: O-Two Systems International Inc. (CA)

(*) Notice: Subject to any disclaimer, the term of this patent is extended or adjusted under 35 U.S.C. 154(b) by 0 days.

(21) Appl. No.: 09/632,998

(22) Filed: Aug. 4, 2000

(51) Int. Cl.⁷ .................................................. G09B 23/28
(52) U.S. Cl. ............................................ 434/265; 434/272
(58) Field of Search ................................... 434/262, 265, 434/267, 268, 270, 272

(56) References Cited

U.S. PATENT DOCUMENTS

| | | | |
|---|---|---|---|
| 3,872,609 | * 3/1975 | Smrka | 434/265 |
| 4,001,950 | * 1/1977 | Blumensaadt | 434/265 |
| 4,932,879 | 6/1990 | Ingenito et al. | 434/262 |
| 5,249,968 | 10/1993 | Brault et al. | 434/265 |
| 5,286,206 | 2/1994 | Epstein et al. | 434/265 |
| 5,295,835 | 3/1994 | Scheinberg et al. | 434/265 |
| 5,330,514 | 7/1994 | Egelandsdal et al. | 434/265 |
| 5,423,685 | 6/1995 | Adamson et al. | 434/265 |
| 5,537,998 | 7/1996 | Bauman | 128/205.23 |
| 5,540,592 | 7/1996 | Scheinberg et al. | 434/265 |
| 5,557,049 | 9/1996 | Ratner | 73/715 |
| 5,580,255 | * 12/1996 | Flynn | 434/265 |
| 5,593,306 | 1/1997 | Kohnke | 434/267 |
| 5,823,787 | * 10/1998 | Gonzalez | 434/265 |
| 5,853,292 | * 12/1998 | Eggert | 434/262 |
| 5,885,084 | 3/1999 | Pastrick et al. | 434/265 |

* cited by examiner

Primary Examiner—Jacob K. Ackun, Jr.
Assistant Examiner—K Fernstrom
(74) Attorney, Agent, or Firm—Mark Kusner

(57) ABSTRACT

A ventilation training analyzer manikin, for providing a quantitative measurement of the relative proportions of breathable gas volume delivered to a patient's lungs and patient's stomach during ventilation attempts by a user, thus demonstrating that the user is or is not using proper ventilation methods and equipment operating techniques. The manikin has a pressure actuated valve that opens at 15 cm $H_2O$ gas pressure to mimic the opening of the human esophageal sphincter. The opening of the valve at high pressure shows users that delivery of excess volumes of high pressure gas results in aspiration of the stomach contents, potential lung damage and risk of death in some cases. The manikin provides (1) an anatomical simulation of a human respiratory tract including a pharynx model structure, a larynx model structure; and lung model structure for mimicking the physiological attributes of a human bronchia and lungs, and measuring the tidal volume of gas delivered to the lungs and (2) an anatomical simulation of an upper portion of a human alimentary canal including the pharynx model structure and an esophagus model structure with means for measuring the tidal volume of gas delivered to the stomach and lower esophageal sphincter pressure actuated valve for mimicking the physiological attributes of a human lower esophageal sphincter to open when gas pressure differential between an upstream and a downstream portion of the esophageal model structure exceeds a selected threshold pressure differential such as 15 cm $H_2O$. Gas volume detection means can include: a vane type respirometer; a flow transducer; and a pressure transducer.

9 Claims, 1 Drawing Sheet

VENTILATION TRAINING ANALYZER MANIKIN

TECHNICAL FIELD

The invention relates to a ventilation training analyzer manikin, for providing a quantitative measurement of the relative proportions of breathable gas volume delivered to a patient's lungs and to a patient's stomach during ventilation attempts by a user, thus indicating proper and improper ventilation methods and equipment operating techniques.

BACKGROUND OF THE ART

Emergency medical service providers require adequate training and frequent practice to master proper techniques and use of equipment in ventilating patients or applying to cardiopulmonary resuscitation.

In the field of cardiopulmonary resuscitation and respiratory resuscitation, the problem concerned with delivery of a consistent ventilation is well defined in the relevant literature. In particular, the quality of ventilation delivery when operator powered devices are used is particularly suspect and varies greatly according to experience, training and general coordination ability.

Operator powered devices include bag-valve-masks, face shields, and pocket masks. Air and oxygen are delivered with a bag-valve-mask when the operator physically squeezes the inflated bag to deliver a tidal volume of air to the patient's respiratory system.

In theory the medical service provider should pay attention to consistently timed tidal volumes of approximately equal volume and pressure dependent on the body size and age of the patient. In practice, however emergency care personnel are often under extreme stress and have many other duties to perform in urgent care situations that tend to reduce the attention and level of care directed to ventilation techniques. Manually operated valves delivering pressurized gas from storage cylinders are also used improperly since operators are busy and preoccupied with other duties and may not provide a consistent timing or volume of gas delivered.

In fact, there are no published medical studies on such devices, particularly bag-valve-masks that show that they are efficacious. On the contrary, there is a large volume of published papers showing that they do not function adequately in the hands of the majority of medical service providers. The efficacious use of manually operated ventilating devices varies greatly according to the attention of the user, their experience, training, and many other factors.

The problem in the emergency medical service field is that users generally perceive that they are competent in using the devices and that the devices and methods themselves are efficacious. Judging from the clinical research however, these beliefs are totally unfounded. Ideally, an automatic ventilator with appropriate patient condition monitoring circuits and cautionary alarms can be used to provide consistent care to the patient. However, due to the perceived high cost, many decision-makers are not persuaded to spend the extra funds on devices since they perceive that the manually operated devices function efficiently.

A particular problem with bag-valve-masks and other operator-powered devices is the delivery of excess volumes of gas at high-pressure in excess of the patient's need. Excessive pressure and volume of gas causes aspiration of the stomach contents once the limited resistance of the esophageal sphincter is overcome. There is a potential for lung damage due to excessive pressure and in the worst cases death can result from lung rupture or from choking on stomach contents that back up the unconscious patient's esophagus.

The confidence that emergency medical personnel have in the operator powered ventilators is reflected in the prior art since the are few training manikins or devices specifically directed to the over pressure and excessive volume of gas delivered which results in aspiration of stomach contents. Many training devices relate to cardiopulmonary resuscitation (CPR) due to the need to train large numbers of otherwise medically unskilled persons. An absence of ventilation training devices illustrates the widespread misconception that medical care personal are adequately trained with existing equipment.

U.S. Pat. No. 5,557,049 to Ratner discloses a disposable manometer, which is used on a CPR bag-valve-mask device to indicate the pressure of gas being delivered to the patient. The Ratner solution presumes that the user has time and attention available to view the manometer and adjust their ventilation efforts accordingly. However, in reality during literally life and death situations the operators are constantly preoccupied. The bag-valve-mask requires almost continuous contact with one hand of the user and thereby imposes extreme limitations on their actions. In an effort to accomplish more than one task at a time, the user can easily neglect the bag-valve-mask or deliver inconsistent ventilation to the patient.

U.S. Pat. No. 5,537,998 to Bauman provides a spring loaded piston which serves to detect and exhaust excess air pressure in a simple manual resuscitator with vent ports open depending on the extent of internal pressure delivered to the patient with the manual resuscitator.

U.S. Pat. No. 5,286,206 to Epstein et al. discloses a CPR manikin and disposable lung bag wherein the lung bag includes a primary portion inflated to mimic the inflation of the lungs and a secondary portion separated by a flow restricting orifice to mimic the aspiration of the stomach when air delivered to the lungs is of excessive volume or pressure in applying manual CPR.

U.S. Pat. No. 5,330,514 to Egelandsdal et al. discloses a dummy for practicing cardiopulmonary resuscitation which includes a flexible bag with high pressure relief port to mimic the inflation and deflation of a patient's lung during CPR application.

None of the prior art devices specifically teach the trainee to prevent stomach aspiration by limiting the pressure and volume of gas with any degree of accuracy.

It is an object of the present invention to provide a clear quantitative measurement of the volume of gas delivered to both the lungs and the stomach during respiratory resuscitation thereby providing an indication of the quality of the resuscitation efforts being delivered by the trainee.

It is a further object of the invention to provide a training manikin that imitates human anatomy and physiology to train persons involved in respiratory resuscitation in the proper methods of avoiding aspiration of stomach contents and delivery of excessive pressure or tidal volume.

A further object of the invention is to provide means to demonstrate particularly to experienced users that, despite their many years of conventional training and on-the-job experience, they are not performing ventilation functions correctly with operator powered devices and to provide users with a quantitative measurement of their incompetence with these devices thus allowing them to practice and perfect their skills in a real life situation.

Further objects of the invention will be apparent from review of the disclosure and description of the invention below.

DISCLOSURE OF THE INVENTION

The invention relates to a ventilation training analyzer manikin, for providing a quantitative measurement of the relative proportions of breathable gas volume delivered to a patient's lungs and patient's stomach during ventilation attempts by a user.

The manikin has a pressure actuated valve that opens at 15 cm $H_2O$ gas pressure to mimic the opening of the human esophageal sphincter. The opening of the valve at high pressure shows users that delivery of excess volumes of high pressure gas results in aspiration of the stomach contents, potential lung damage and risk of death in some cases.

The manikin provides (1) an anatomical simulation of a human respiratory tract including a pharynx model structure, a larynx model structure; and lung model structure for mimicking the physiological attributes of a human bronchia and lungs, and measuring the tidal volume of gas delivered to the lungs and (2) an anatomical simulation of an upper portion of a human alimentary canal including the pharynx model structure and an esophagus model structure with means for measuring the tidal volume of gas delivered to the stomach and lower esophageal sphincter pressure actuated valve for mimicking the physiological attributes of a human lower esophageal sphincter to open when gas pressure differential between an upstream and a downstream portion of the esophageal model structure exceeds a selected threshold pressure differential such as 15 cm $H_2O$. Gas volume detection means can include: a vane type respirometer; a flow transducer; and a pressure transducer.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawing wherein.

Figure 1:
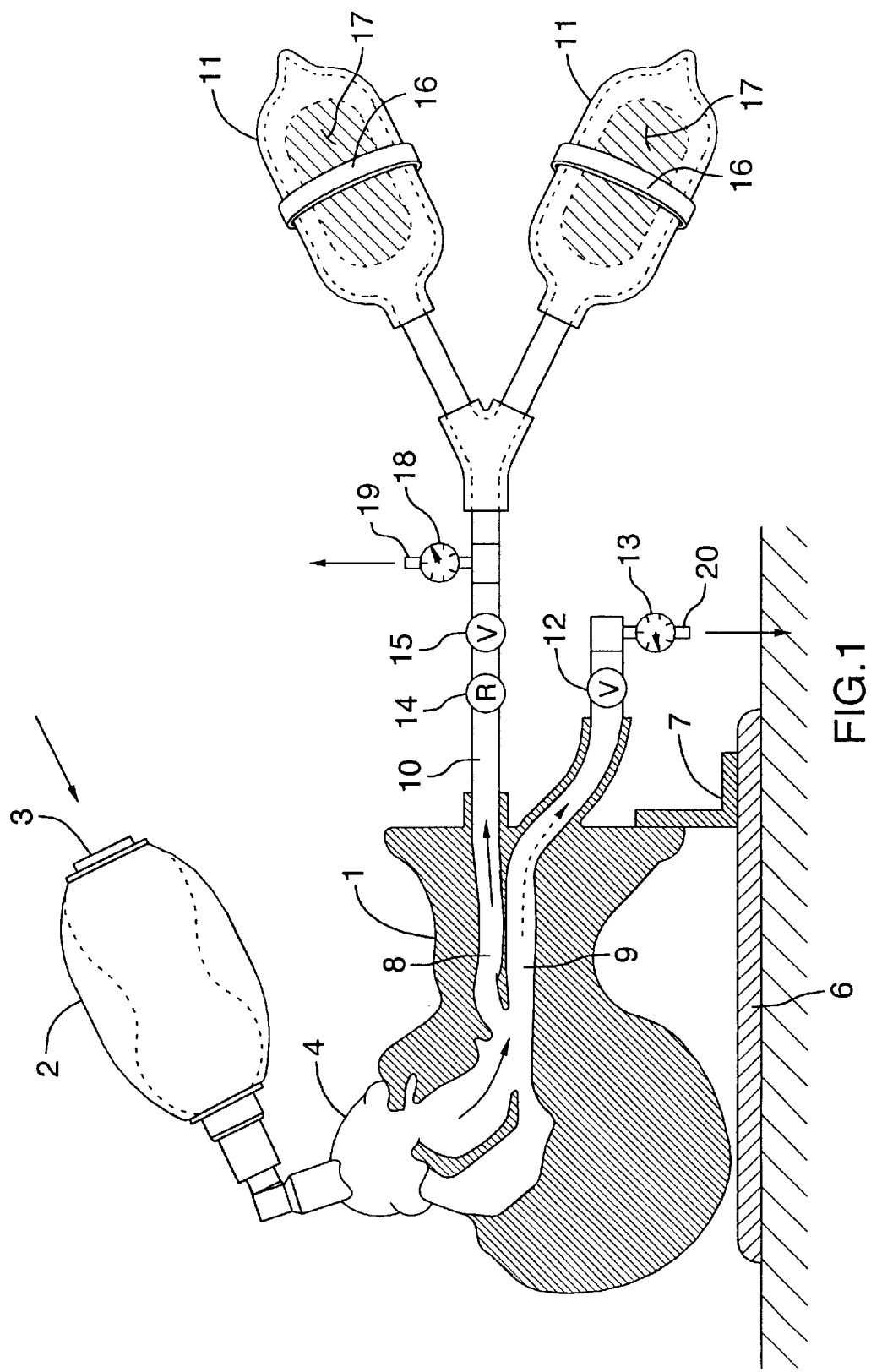
FIG. 1 is a schematic view of the invention showing a manikin head ventilated with a conventional bag-valve-mask device, the manikin including.

- a pair of model lungs with bronchia and associated check valve, airway gas flow restrictor and vane type respirometer to capture and measure the tidal volume of gas delivered to the lung model, and
- an esophageal tube model with one way pressure activated check valve to imitate the esophageal sphincter with downstream vane type respirometer to capture and measure the tidal volume of gas delivered to the stomach model.

DETAILED DESCRIPTION OF PREFERRED EMBODIMENTS

With reference to FIG. 1 the ventilation training analyzer manikin in accordance with the invention will be generally described in detail below.

The ventilation training analyzer manikin provides a quantitative measurement of the relative proportions of breathable gas volume delivered to a patient's lungs and a patient's stomach during ventilation attempts by the user with operator powered devices.

Conventional operator powered ventilator devices can include the bag-valve-mask 2, as shown in FIG. 1, which is manually positioned and operated by the user in conjunction with the manikin head 1. As is conventional, the user reciprocally squeezes and releases the bag 2 thereby pumping air from a valve 3 to the face mask 4 thereby delivering pressurized tidal volumes of air or breathable gas to the pharynx model structure 5 of the manikin head 1 as indicated by arrows in FIG. 1.

In order to provide a realistic simulator, the manikin head 1 is mounted on a base plate 6 with hinge 7 to permit realistic head positioning that allows for ventilatory support with all forms of conventional resuscitation equipment. Preferably, the manikin head 1 includes realistic anatomy of teeth, tongue, oral and nasal pharynx 5, epiglottis, larynx 8, arytenoid, false and true vocal cords, esophagus 9, trachea 10, self deflating lung bags 11, and means to imitate the functioning of the esophageal sphincter 12 and stomach 13 during resuscitation operations.

In order to provide realistic simulation of the lung physiology, a gas flow restrictor 14 together with flexible inflatable lung bags 11 downstream of a one way check valve 15 include flexible lung compliance bands 16 and resilient foam inserts 17 housed within the lung bags 11. The combination of flow restrictor 14, flexible bags 11, compliance bands 16 and foam inserts 17 can be tailored to the physiology of an adult or a child as desired. Preferably, for training of users the lung bags 11 are positioned in an orientation visible to the user in a preferred embodiment.

Therefore, when properly operated the manual squeezing of the bag-valve-mask 2 provides a tidal volume of air which passes the flow restrictor 14 and one-way valve 15 thereby filling the lung bags 11 to simulate the intake of breath by the patient. The one way valve 15 prevents aspiration of the gas except through the vane type respirometer 18. The respirometer 18 exhausts the gas through a vent 19 after measuring the tidal volume of gas delivered to the lung model. Therefore, by capturing the tidal volume delivered with one way valve 15 and thereafter measuring the pressurized gas volume on expiration through the vent 19, the respirometer 18 can give an accurate quantitative measure of the tidal volume of gas delivered.

However, if the user squeezes the bag-valve-mask 2 excessively providing a high volume or high pressure, the manikin includes means to mimic the aspiration of the stomach as follows.

When the pressure of the gas delivered to the pharynx 5 exceeds a pre-selected pressure such as 15 cm. $H_2O$, the pressure actuated check valve 12 opens and simulates the delivery of pressurized air through the stomach via the esophagus 9. The volume of air passing through the esophagus and pressure actuated check valve is measured by the stomach respirometer. 13 and exhausted through vent 20.

Thereby the invention provides two measurements with respirometers 18 and 13 to demonstrate to the user that gas has been delivered to the stomach due to high pressure which overcomes the pressure activated valve 12. As well, the user can visualize the inflation of the lungs by watching the inflation of the flexible lung bags 11 and thereby obtain assurance that sufficient gas has been delivered at adequate pressure and volume, without exerting excess effort that only serves to aspirate the stomach contents.

Specifically, the manikin provides an anatomical simulation of the human respiratory track including the pharynx module structure 5, the larynx model structure 8 and lung modeling means for mimicking the physiological attributes of the human lungs. In addition, the manikin provides an anatomical simulation of the upper portion of the human elementary canal including the pharynx module structure 5 and esophagus model structure 9 with a modeling of the lower esophageal sphincter in the form of the pressure actuated check valve 12. The pressure activated check valve 12 opens when gas pressure differential between an upstream and a downstream portion of the esophageal model structure 9 exceeds the selective threshold pressure differential For example, a pressure differential of 15 cm. $H_2O$ is considered average to imitate the lower esophageal sphincter of the average adult human, and a preferred embodiment includes variation between 10–20 cm $H_2O$.

The lung modeling structure includes means to measure the lung gas volume by capturing and measuring the tidal volume of gas delivered to the lung model by the user. The means to measure the lung gas volume include the one-way check valve 15 to capture the gas delivered and gas detection and measuring means such as a vane type respirometer 18. Other means of measuring the volume of gas are well known to those skilled in the art and can include a flow transducer and a pressure transducer.

The human lower esophageal sphincter is modeled by means that measure the gas volume delivered to the stomach such as respirometer 13 and pressure activated one-way check valve 12 which is calibrated to open at the selective pressure differential to mimic human sphincter resistance. The normal adult sphincter resistance is 15 cm. $H_2O$ however it may be preferable to provide a variable pressure resistance between 10 and 20 cm $H_2O$ in order to provide a clear demonstration to the user of the effect.

Although the above description and accompanying drawings relate to a specific preferred embodiment as presently contemplated by the inventors, it will be understood that the invention in its broad aspect includes mechanical and functional equivalents of the elements described and illustrated.

The embodiments of the invention in which an exclusive property or privilege is claimed are defined as follows:

1. A ventilation training analyzer manikin, for providing a quantitative measurement of the relative proportions of breathable gas volume delivered to a patient's lungs and patient's stomach during ventilation attempts by a user, the manikin comprising:

an anatomical simulation of a human respiratory tract including a pharynx model structure, a larynx model structure; and lung modelling means for mimicking the physiological attributes of a human bronchia and lungs;

an anatomical simulation of an upper portion of a human alimentary canal including said pharynx model structure and an esophagus model structure with lower esophageal sphincter modelling means for mimicking the physiological attributes of a human lower esophageal sphincter to open when gas pressure differential between an upstream and a downstream portion of the esophageal model structure exceeds a selected threshold pressure differential; and wherein:

the lung modelling means including lung gas volume measuring means for capturing and measuring the tidal volume of gas delivered to the lung modelling means by the user; and the lower esophageal sphincter modelling means including stomach gas volume measuring means for capturing and measuring the tidal volume of gas delivered to the lower esophageal sphincter modelling means by the user.

2. A ventilation training analyzer manikin according to claim 1 wherein the lung gas volume measuring means includes a one-way check valve and gas detection means selected from the group consisting of: a vane type respirometer; a flow transducer; and a pressure transducer.

3. A ventilation training analyzer manikin according to claim 2 wherein the lung gas volume measuring means includes at least one flexible inflatable lung bag downstream of the one-way check valve.

4. A ventilation training analyzer manikin according to claim 3 wherein the lung bag includes lung compliance bands about the bag.

5. A ventilation training analyzer manikin according to claim 3 wherein the lung bag includes resilient foam inserts housed within the bag.

6. A ventilation training analyzer manikin according to claim 3 including two lung bags disposed in an orientation visible to the user.

7. A ventilation training analyzer manikin according to claim 1 wherein the lower esophageal sphincter modelling means includes a one-way check valve calibrated to open at said selected threshold pressure differential and gas detection means selected from the group consisting of: a vane type respirometer; a flow transducer; and a pressure transducer.

8. A ventilation training analyzer manikin according to claim 7 wherein the selected pressure differential is in the range of 10–20 cm $H_2O$.

9. A ventilation training analyzer manikin according to claim 8 wherein the selected pressure differential is about 15 cm $H_2O$.

* * * * *